United States Patent [19]

Volk, Jr.

[11] Patent Number: 4,767,301

[45] Date of Patent: Aug. 30, 1988

[54] AUTOMATIC CONTROL FOR AN EXTRUDER

[75] Inventor: Joseph A. Volk, Jr., Creve Coeur, Mo.

[73] Assignee: Beta Raven Inc., Earth City, Mo.

[21] Appl. No.: 118,434

[22] Filed: Nov. 9, 1987

[51] Int. Cl.⁴ .................. B29C 47/78; B29C 47/92
[52] U.S. Cl. ........................... 425/144; 425/425; 425/149; 425/308; 425/378 R; 425/DIG. 230; 425/378.1
[58] Field of Search ............ 264/142, 40.5, 40.6, 264/40.7, 141; 425/143, 144, 145, 149, 308–311, DIG. 230, 376 R, 378 R

[56] References Cited

U.S. PATENT DOCUMENTS

| | | | |
|---|---|---|---|
| 3,723,035 | 3/1973 | Franke | 425/308 |
| 3,932,736 | 1/1976 | Zarrow et al. | 425/DIG. 230 |
| 4,120,630 | 10/1978 | Laspisa et al. | 425/145 |
| 4,311,446 | 1/1982 | Hold et al. | 425/145 |
| 4,550,002 | 10/1985 | Uhland et al. | 264/40.6 |
| 4,721,448 | 1/1988 | Irish et al. | 264/40.6 |
| 4,721,589 | 1/1988 | Harris | 264/40.6 |

Primary Examiner—Willard Hoag
Attorney, Agent, or Firm—Rogers, Howell, Moore & Haferkamp

[57] ABSTRACT

An automatic control for an extruder has a temperature sensor which monitors the exit temperature of the extrudate and several pressure transducers which monitor the pressure within the extruder to control the cooking of the mash inside the extruder to ensure production of high quality extrudate. The controller monitors and controls the temperature and moisture content of the mash in the extruder by controlling the input of various ingredients and also the cooling or heating of the mash near the exit of the extruder through a heat exchanger.

21 Claims, 1 Drawing Sheet

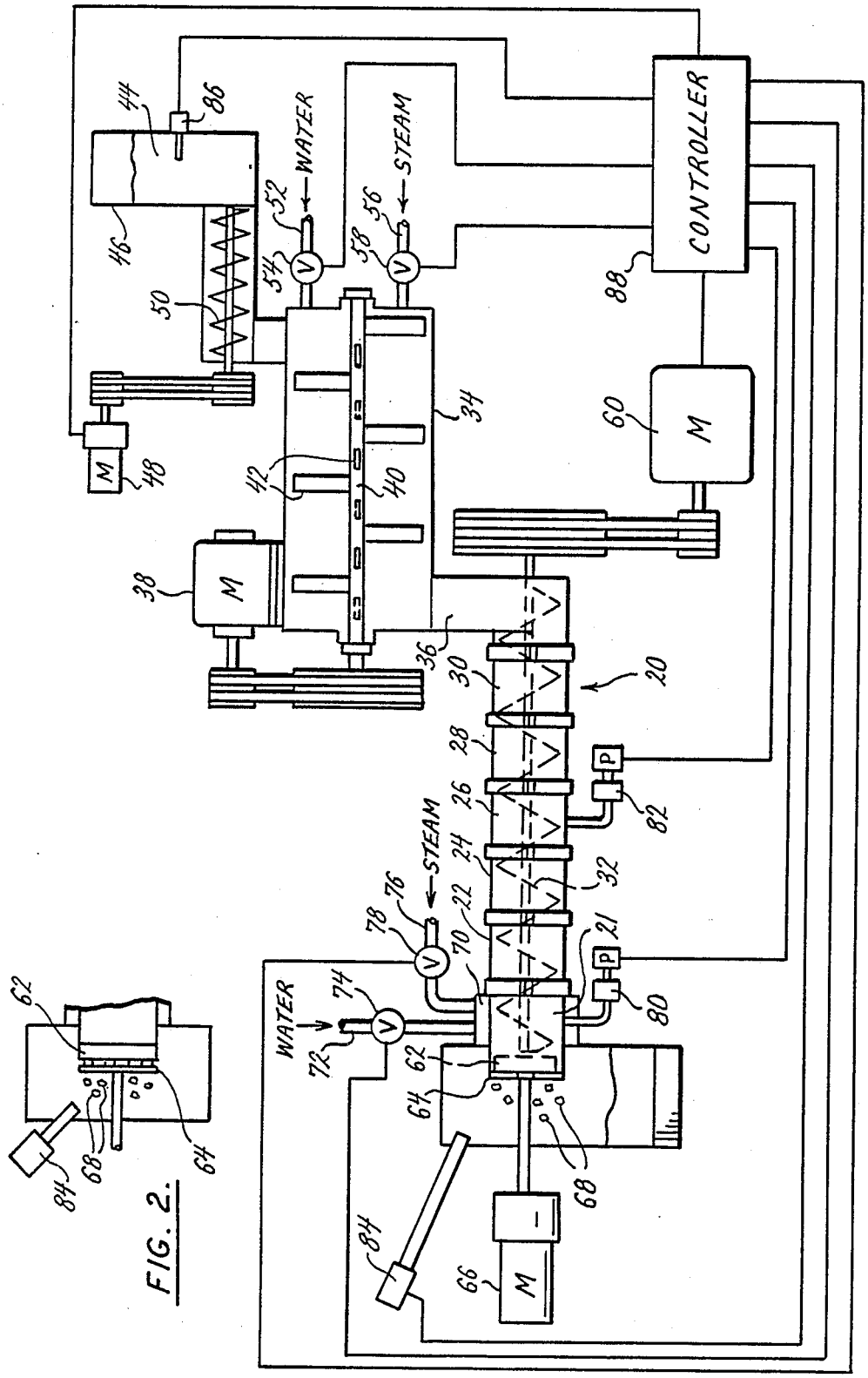

AUTOMATIC CONTROL FOR AN EXTRUDER

BACKGROUND AND SUMMARY OF THE INVENTION

Extruders are presently used to produce a wide variety of food products through the process of pressurizing and heating a mixture of dry material and moisture, and then forcing the material through a die to form an extrudate after which the extrudate is cut into a pellet or other form by a number of rotating blades. One type of extruder includes a screw which has a varying blade pitch and also a varying depth, the screw being surrounded by a barrel or series of barrels which confine the material as it is pressurized by the screw. The screw moves the material through the barrel and into a die, the die having a series of holes through which the material is pushed, and a number of blades which are motor driven to rotate about the die cut the material off after it is pushed through the holes. In a typical process, the pressure inside the extruder may be 350 psi and the temperature can be elevated above 400° F. In an extrusion process, these intense pressures and temperatures are important in creating the finished product by both cooking the product, and also providing for an expanded or puffed effect after the product is released through the die into the lower atmospheric pressure.

In any extruder, it is important to operate the extruder such that the proper temperatures and pressures are attained while also maximizing the throughput of material. In the prior art, the inventor herein is not aware of any automatic extruder controller which attempts to maximize the throughput capability of the extruder. Instead, those controls of which the inventor is aware merely focus on attaining the proper temperatures for the extrudate as it is released through the die. However, there is no appreciation in the prior art for the effect of this temperature as well as pressure, and their relationship to the throughput which may be attained. The inventor believes that as the temperature and pressure rise in the extruder, then steam will be formed from the water in the material as it is cooked. Although a substantial portion of the water in the material may be converted into steam without affecting the extruder process, as the liquid moisture levels reach a minimum value, there is a tendency for the extruder to choke or overload because of the increased friction caused by the reduced lubrication in the material, as well as a solidification of the material itself. Therefore, this factor limits the maximum throughput capability of the extruder. To avoid this choking, various actions can be taken. These include lowering the temperature of the extruded material by either adding cooling water to the last barrel of the extruder or adding greater amounts of water to the mash itself as it is input to the extruder. If the temperature drops too low, then steam can be added to the last barrels of the extruder to elevate the temperature of the mash, or steam may be directly added to the mash as it is input to the extruder.

To take advantage of these operating characteristics of an extruder and to automate the extruder to increase its throughput without deleteriously affecting the finished product or extrudate, the inventor herein has succeeded in developing a control which monitors the exit temperature of the extrudate and the pressure at several places along the length of the extruder and uses these measured parameters to control the input of dry material and moisture for the mash, as well as directly controlling the temperature of the last barrel section by controlling the flow of water or steam through a jacket surrounding it. It is believed that with the inventor's controller, an extruder may be operated at or near its maximum throughput while producing a "cooked" extrudate which has been processed at the proper temperatures and pressures. Furthermore, by measuring the pressure within the extruder, the thermodynamic point at which water changes into steam may be carefully calculated and utilized in operating the extruder. As the extruder has a tendency to wear over its operating life, the continuous pressure measurements can take account of that fact to maximize extruder throughput and finished product despite the wear of the extruder.

While the principal advantages and features of the extruder controller have been described above, a fuller understanding may be obtained by referring to the drawings and description of the preferred embodiment which follow.

BRIEF DESCRIPTION OF THE DRAWINGS

FIG. 1 is a schematic diagram of the extruder controller of the present invention; and FIG. 2 is a partial cross-sectional view detailing the placement of the temperature sensor.

DETAILED DESCRIPTION OF THE PREFERRED EMBODIMENT

As shown in FIG. 1, a barrel-type extruder 20 is comprised of a plurality of barrel sections 21, 22, 24, 26, 28, and 30 which are aligned to form the barrel extruder 20, as known in the art. Inside the extruder 20 is a screw 32 which compresses the mash to pressurize it as it traverses the extruder 20. A conditioner 34 mixes the ingredients to create a mash for input through input section 36 to the extruder 20, as known in the art. The conditioner 34 has a motor 38 driving a rotating shaft 40 with paddles 42 for mixing the various ingredients. These ingredients include a dry material 44 contained in a bin 46 which is fed by a motor 48 driving a feed screw 50. Water is input through pipe 52 and controlled by valve 54. Similarly, steam is input through pipe 56 controlled by valve 58. The screw 32 is driven by motor 60 to pressurize the mash which forces it through a die 62. A rotating knife 64 is driven by motor 66 to sever the extrudate into a plurality of pellets 68. Surrounding the last or exit barrel section 21 of extruder 20 is a jacket 70 through which water is fed through pipe 72 as controlled by valve 74 and/or steam which is supplied through pipe 76 controlled by valve 78. The pressure is sensed in the last barrel section by a pressure transducer 80 and in another barrel section 26 by a second pressure transducer 82.

As shown in FIG. 2, the temperature of the extrudate and pellets 68 is sensed by a temperature sensor 84 which may be of the non-contacting variety. Similarly, another temperature sensor 86 is used to sense the temperature of the dry material 44 in bin 46 (see FIG. 1).

The extruder controller 88 of the present invention monitors the extrusion process through pressure transducers 80, 82 and temperature sensors 84, 86. In response to these measured parameters, the controller 88 controls the cooling or heating provided in the last barrel section by controlling the flow of water and steam through valves 74, 78, respectively. Also, the controller 88 controls the input of materials in the creation of the mash in conditioner 34 by controlling the feed screw 48 for dry material 44, and valves 54, 58 for the flow of water and steam.

In operation, the extruder controller of the present invention monitors the extruder by measuring the exit temperature of the extrudate as it emerges from the face of the die, as well as the pressure at various points along the length of the extruder. With these measurements, it is possible to determine the point at which water will change phase into steam inside the extruder. The extruder may then be controlled to approach this temperature by controlling the flow of dry material, water, and steam into the conditioner. Also, the heat exchanger or jacket which surrounds the last barrel section can be utilized to affect a somewhat quicker change in exit temperature. This is achieved by controlling the flow of water or steam through the jacket. Thus, by utilizing the extruder controller of the present invention, the extrusion process may be much more accurately monitored thereby producing superior extrudate at or near the maximum throughput capability of the extruder. Furthermore, by monitoring the pressure at several points along the extruder, continuous correction is made for wear in the extruder which has a tendency to reduce the pressures attainable.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. In a barrel-type extruder having means to pressurize a mixture of ingredients and produce pellets therefrom, and means to feed a supply of a mixture of a plurality of ingredients to the pellet producing means, the extruder including a plurality of barrel sections arranged substantially in a straight line, the end barrel section having a die covering the outer face thereof, the die having a plurality of holes through which the mixture is extruded, and means to cut said extrudate into pellets, the improvement comprising means to sense the temperature of the finished pellets as they are cut by said cutting means, and means to automatically control the extruder in response to said temperature sensor.

2. The device of claim 1 further comprising means to select a desired pellet temperature, and wherein the control means has means to control the extruder to maintain said desired pellet temperature.

3. The device of claim 2 wherein the control means has means to vary the proportional content of the mixture of ingredients.

4. The device of claim 3 wherein at least one of the ingredients is predominantly moisture, and wherein the control has means to vary the moisture content of the mixture in response to the temperature sensor.

5. The device of claim 3 wherein the control means further comprises means to add heat to or absorb heat from the extruder in response to the temperature sensor.

6. The device of claim 4 further comprising means defining a chamber at least partially surrounding the extruder, and means to circulate a fluid through said chamber to either add heat to or absorb heat from the extruder.

7. An automatic control for an extruder, the extruder including a pellet producing means, means to feed a mash to the extruder, said mash being comprised of a mixture of dry material and moisture, the moisture being either or both of water and steam, the pellet producing means having means to sever the extrudate into pellets, the control comprising means to sense the temperature of pellets as they are severed from the extrudate by the severing means, and means to vary the temperature of the material in response to the temperature sensor.

8. The device of claim 7 wherein the control means has means to vary the amounts of water and steam being added.

9. The device of claim 7 wherein the temperature varying means includes means defining a chamber at least partially surrounding the extruder, and means to circulate a fluid through said chamber to either add heat to or absorb heat from the extruder.

10. The device of claim 8 wherein the temperature varying means includes means defining a chamber at least partially surrounding the extruder, and means to circulate a fluid through said chamber to either add heat to or absorb heat from the extruder.

11. The device of claim 7 wherein the temperature means comprises a non-contacting temperture sensor.

12. The device of claim 7 further comprising means to sense the pressure inside the extruder, the control being at least partially responsive to said pressure sensor.

13. The device of claim 12 wherein the pressure sensor is positioned to sense the pressure at a point proximate the pellet producing means.

14. The device of claim 12 wherein the control has means to calculate the pressure-temperature point at which water in the extruder changes phase into steam, and means to control the extruder to operate at or near said pressure-temperature point.

15. The device of claim 12 wherein the temperature varying means comprises means to vary the input of water or steam into the mash.

16. The device of claim 12 wherein the pressure sensor comprises a plurality of pressure sensors, said pressure sensors being spaced along the extruder to sense the pressure at vaious points therein.

17. An automatic control for an extruder, the extruder having means to heat and pressurize a mixture of materials, a die, and means to force the mixture through the die to produce an extrudate, the control having means to sense the temperature of the extrudate immediately as it exits the die, means to sense the pressure in the extruder at a point substantially adjacent the die, and means to automatically control the extruder to maintain the exit temperature of the extrudate at a desired value at least partially in response to both the temperature sensing means and the pressure sensing means.

18. The device of claim 17 wherein the control has means to vary the desired exit temperature in response to a change in pressure.

19. The device of claim 17 wherein the temperature sensing means comprises a non-contacting temperature sensor.

20. The device of claim 17 wherein the extruder further comprises means to sever the extrudate into pellets as it exits the die, the temperature sensing means having means to sense the temperature of the pellets immediately as they are severed.

21. The device of claim 17 further comprising an input section, means to feed a supply of dry material to the input section, and means to feed a supply of moisture to the input section, the input section having means to mix said material and moisture and feed said mixture to the extruder, the control including means to control the dry material feed means and the moisture feed means at least partially in response to the temperature sensing means and the pressure sensing means.

* * * * *